F. E. KNITTEL.
WEANING DEVICE.
APPLICATION FILED JULY 15, 1916.
1,214,927.
Patented Feb. 6, 1917.
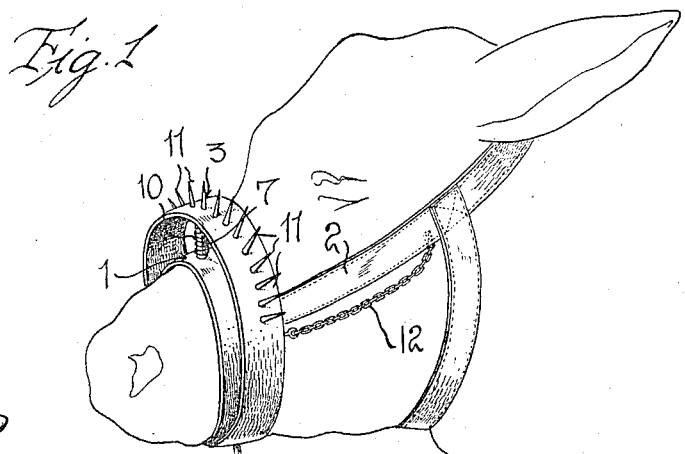
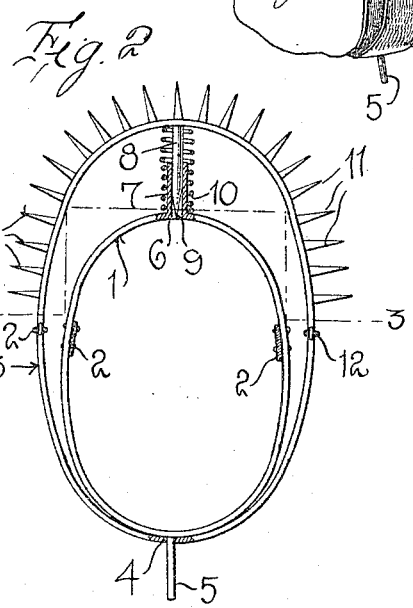
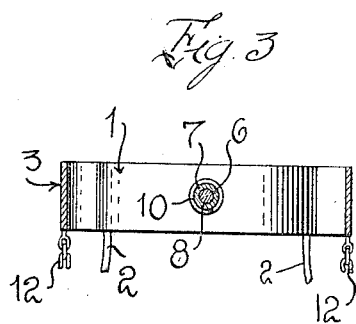
Inventor
F. E. KNITTEL
By Watson E. Coleman
Attorney

UNITED STATES PATENT OFFICE.

FRANK E. KNITTEL, OF MOORELAND, OKLAHOMA.

WEANING DEVICE.

1,214,927.  Specification of Letters Patent.  Patented Feb. 6, 1917.

Application filed July 15, 1916. Serial No. 109,563.

*To all whom it may concern:*

Be it known that I, FRANK E. KNITTEL, a citizen of the United States, residing at Mooreland, in the county of Woodward and State of Oklahoma, have invented certain new and useful Improvements in Weaning Devices, of which the following is a specification, reference being had to the accompanying drawings.

This invention comprehends certain new and useful improvements in weaning devices for calves and colts, and the invention has for its primary object an efficient device of this character, the parts of which may be very easily manufactured and readily assembled and not liable to get out of order.

A further object of the invention is a weaning device which may be easily applied to the head of the animal and securely retained thereon, and which in operation will effectively prevent the animal from nursing, owing to the arrangement of the parts whereby the pressure of the device upon the cow or mare will not only cause her to draw away, but will at the same time serve to prick the head of the calf or colt, thereby causing it to desist, whereby after several ineffectual attempts the young animal will graze and finally be weaned.

And the invention also aims to generally improve devices of this character so as to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which, Figure 1 is a perspective view of my improved weaning device, showing it in applied position, Fig. 2 is a plan view of the device with parts broken away, and Fig. 3 is a transverse sectional view on the line 3—3 of Fig. 2.

Referring to the drawing, the numeral 1 designates a band, preferably of metal, which is designed to be placed upon the nose of the animal to be weaned, said nose band having supporting and retaining straps 2 connected thereto in any desired way, so that the device may be effectively supported and not liable to become accidentally detached.

3 designates a band encircling member or ring which surrounds the nose band 1 as shown, and which is provided at one end with an opening or perforation 4 designed to receive and accommodate the elongated journal rod 5 which is secured to and which projects rearwardly from the elliptical nose band 1, as clearly illustrated in the drawing, said rod 5 serving as a guide for the member or ring 3 when said ring or member 3 is downwardly or rearwardly moved as will hereinafter be explained and which also permits a lateral pivotal or swinging movement of said band or ring 3 when in differing positions relative to the band 1.

The nose band 1 is formed in its foremost portion with an opening 6 defined by a forwardly projecting tube 7 in which a rod 8 is fitted for free movement, said rod projecting rearwardly from the foremost portion of the ring 3 and having a sharpened point or prong 9 formed on its rear extremity, as shown. An expansion coiled spring 10 encircles the tube 7 and rod 8, and bears against the band and ring 3 so as to normally hold the prong 9 retracted or sheathed within the tube 7. The foremost portions of the band encircling ring 3 are formed with spurs 11 of any desired number and character.

Preferably the straps 2 are connected to the sides of the ring 3 by means of flexible link members 12 designed to limit the pivotal movement of the ring relative to the nose band.

From the foregoing description in connection with the accompanying drawing, the operation of my improved weaning device will be apparent. The band 1 is supported by the straps 2 upon the nose of the calf or colt, and it will suffer no discomfort from wearing the device until it attempts to nurse. At this time as is manifest, the forward pressure of the animal upon the nose band 1 against the body of the cow or mare will result in the spurs 11 pricking the dam and thereby causing her to draw off, while at the same time the forward movement of the nose band relative to the ring 3 will cause the sharpened point or prong 9 to come in contact with the calf or colt, and thus effectively deter it from further attempts to nurse.

As the construction and arrangements of the parts provides for a pivotal movement of the nose band relative to the ring 3, as well as a forward bodily movement of the former relative to the latter, it is obvious that the device will be found to be a very effective one, and at the same time will not cause any discomfort to the animal wearing it, so long as it continues to graze.

While the accompanying drawing illustrates what I believe to be the preferred embodiment of my invention, it is to be understood that the invention is not limited thereto but that various changes may be made in the construction, arrangements and proportions of the parts without departing from the scope of the invention as claimed.

What is claimed, is:

A weaning device of the character described, comprising a nose band provided with means whereby it may be supported upon the nose of a colt or calf, a ring encircling said band and provided with spurs, a connection between said ring and band permitting lateral pivotal movement of one relative to the other as well as a bodily movement of one in respect to the other, a prong carried by one of these parts and normally concealed within the other and arranged to be projected within the nose band upon the forward movement of the latter relative to the ring, spring means normally tending to hold the nose band in its rearward position with the prong sheathed, and means for limiting the relative lateral pivotal movement between said ring and band.

In testimony whereof I hereunto affix my signature in the presence of two witnesses.

FRANK E. KNITTEL.

Witnesses:
H. A. SEATON,
RUTH M. WILKIE.

Copies of this patent may be obtained for five cents each, by addressing the "Commissioner of Patents, Washington, D. C."